United States Patent [19]
Ziccardi

[11] Patent Number: 5,829,826
[45] Date of Patent: Nov. 3, 1998

[54] CONVERTIBLE CHILDS CHAIR

[76] Inventor: Maryanne Ziccardi, 16 Adams Dr., Burlington, N.J. 08016

[21] Appl. No.: 890,874

[22] Filed: Jul. 10, 1997

[51] Int. Cl.[6] .................................................. A47D 11/00
[52] U.S. Cl. ........................ 297/118; 297/344.12; 280/30
[58] Field of Search ................................. 297/118, 130, 297/344.12, 344.18; 280/30

[56] References Cited

U.S. PATENT DOCUMENTS

| | | | |
|---|---|---|---|
| 2,435,733 | 2/1948 | Belyeu | 280/30 |
| 3,269,771 | 8/1966 | Erdos | 297/118 X |
| 4,258,826 | 3/1981 | Murray | 280/30 X |
| 4,586,721 | 5/1986 | Harada et al. | 280/30 |
| 5,165,755 | 11/1992 | Rho | 297/344.18 |
| 5,348,374 | 9/1994 | Kuo | 297/344.18 |

*Primary Examiner*—Peter R. Brown

[57] ABSTRACT

The present invention relates to a child's chair that can be converted from a stroller type chair to a high chair. In its broadest terms, the present invention includes a wheelbase that is pivotally interconnected to a handle. Both the wheelbase and handle include internal slots. A seat is positioned intermediate the slots. Thus, the seat can be positioned at a location intermediate the wheel base. This is the stroller configuration. Alternatively, the seat can be slid along the slots to be positioned at a location intermediate the handle. The latter configuration is the high chair configuration. The various components of the present invention, and the manner in which they interrelate, will be described in greater detail hereinafter.

5 Claims, 3 Drawing Sheets

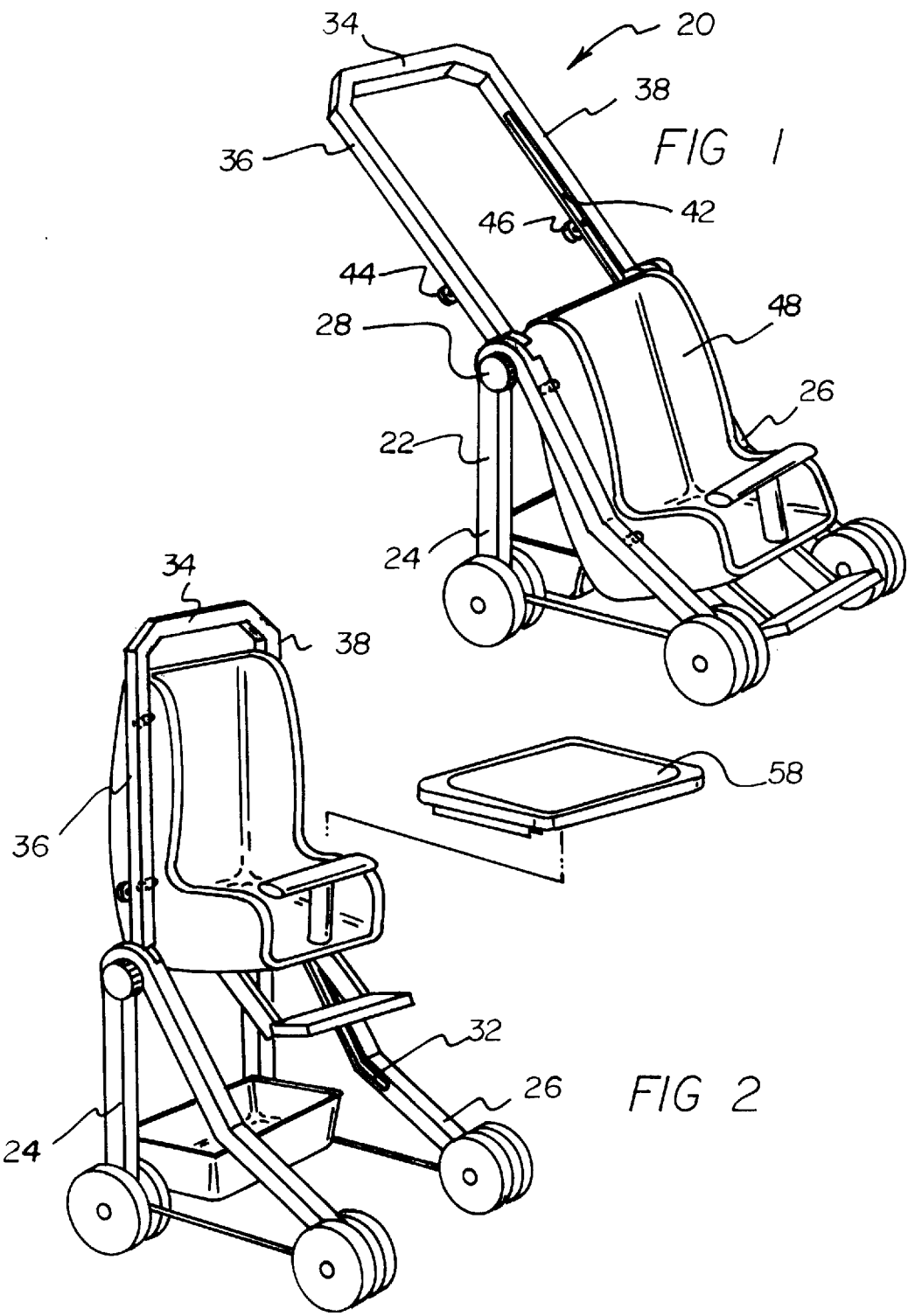

CONVERTIBLE CHILDS CHAIR

BACKGROUND OF THE INVENTION

1. Field of the Invention

The present invention relates to a new and improved convertible child's chair and, more particularly, pertains to a chair that can be configured as a stroller or a high chair.

2. Description of the Prior Art

The use of strollers is known in the prior art. More specifically, strollers heretofore devised and utilized for the purpose of transporting children are known to consist basically of familiar, expected, and obvious structural configurations, notwithstanding the myriad of designs encompassed by the crowded prior art which has been developed for the fulfillment of countless objectives and requirements.

The prior art discloses a large number of strollers. By way of example, U.S. Pat. No. 4,239,259 to Martinez discloses a height adjustable infant stroller high chair. U.S. Pat. No. 5,375,869 to Hsiano discloses a structure for a versatile baby stroller. U.S. Design Pat. No. 297,684 to Taylor, Sr discloses a combined high chair, stroller and seat. U.S. Pat. No. 4,082,349 to Ballenger discloses a commercial duty high chair. U.S. Pat. No. 4,173,355 to Perego discloses a foldable baby carriage with a foldable and adjustable foot rest. U.S. Pat. No. 5,348,374 to Kuo discloses a high chair construction.

In this respect, the convertible chair according to the present invention substantially departs from the conventional concepts and designs of the prior art, and in doing so provides an apparatus primarily developed for the purpose of either transporting a child in the stroller mode, or tending to a child in the high chair mode.

Therefore, it can be appreciated that there exists a continuing need for a new and improved convertible child's chair which can be used for either transporting or attending a child. In this regard, the present invention substantially fulfills this need.

SUMMARY OF THE INVENTION

In view of the foregoing disadvantages inherent in the known types of strollers now present in the prior art, the present invention provides a new and improved convertible child's chair. As such, the general purpose of the present invention, which will be described subsequently in greater detail, is to provide a new and improved convertible child's chair and methods which have all the advantages of the prior art and none of the disadvantages.

To attain this, the present invention essentially comprises a new and improved stroller highchair combination. The combination includes a wheelbase having a first and a second side, with each of the sides having a forward and a rearward wheel at a lower extent and a threaded engagement member at an upper extent. Each of the sides further includes a slot formed at an internal location, with each of the slots having a width and a depth. The combination further includes a handle having a lower extent, an upper extent and an intermediate extent therebetween. Additionally, the handle also has a first side and a second side, with each of the sides of the handle having a slot formed at an internal location. Each of the slots has a width and a depth, with the width and depth of the wheelbase slots matching the width and the depth of the handle slots. A first spring biased plunger is positioned within the slot of the first side of the handle, and a second spring biased plunger is positioned within the slot of the second side of the handle. The lower extent of the first side of the handle is threadably engaged with the upper extent of the of first side of the wheel base, likewise the lower extent of the second side of the handle is threadably engaged with the upper extent of the second side of the wheelbase. Thus the handle is pivotally connected with the wheelbase. The convertible seat also includes an upper extent and a lower extent and an intermediate extent therebetween. The seat is defined by side edges. The seat further includes a first pair of pegs positioned upon a first side of the seat, and a second pair of pegs positioned upon a second side of the seat. The first pair of pegs is positioned within the slot within the first side of the handle and wheelbase, and the second pair of pegs is positioned within the slot within the second side of the handle and wheelbase. The seat thus being capable of sliding from a position inbetween the slots of the wheelbase to a position in between the slots of the handle. The convertible seat also including a detachable canopy positioned at the upper extent of the handle, the canopy when expanded providing shade to the seat. The convertible seat also includes a detachable tray adapted to be removably secured to the side edges of the seat.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved convertible chair which has all the advantages of the prior art strollers and none of the disadvantages.

It is another object of the present invention to provide a new and improved convertible chair which may be easily and efficiently manufactured and marketed.

It is a further object of the present invention to provide a new and improved convertible chair which is of a durable and reliable construction.

An even further object of the present invention is to provide a new and improved convertible chair which is susceptible of a low cost of manufacture with regard to both materials and labor, and which accordingly is then susceptible of low prices of sale to the consuming public, thereby making such a convertible chair economically available to the buying public.

Even still another object of the present invention is to enable a user to buy only one chair but two utilize it in two ways.

Lastly, it is an object of the present invention to provide a child's chair that can be converted from a stroller type chair to a high chair. In its broadest terms, the present invention includes a wheelbase that is pivotally interconnected to a handle. Both the wheelbase and handle include internal slots. A seat is positioned intermediate the slots. Thus, the seat can be positioned at a location intermediate the wheel base. This is the stroller configuration. Alternatively, the seat can be slid along the slots to be positioned at allocation intermediate the handle. The latter configuration is the high chair configuration. The various components of the present invention, and the manner in which they interrelate, will be described in greater detail hereinafter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the convertible child's chair constructed in accordance with the principles of the present invention.

FIG. 2 is an illustration of the convertible chair in the high chair configuration.

The same reference numerals refer to the same parts throughout the various Figures.

DESCRIPTION OF THE PREFERRED EMBODIMENT

Figure 3:
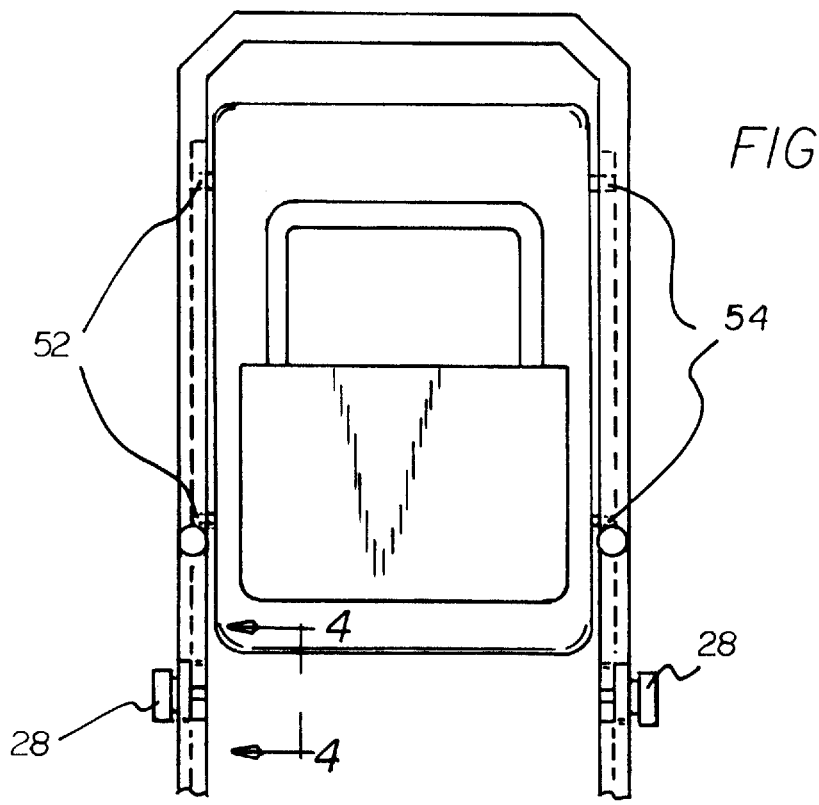
FIG. 3 is a rearview of the handle portion of the chair.
Figure 4:
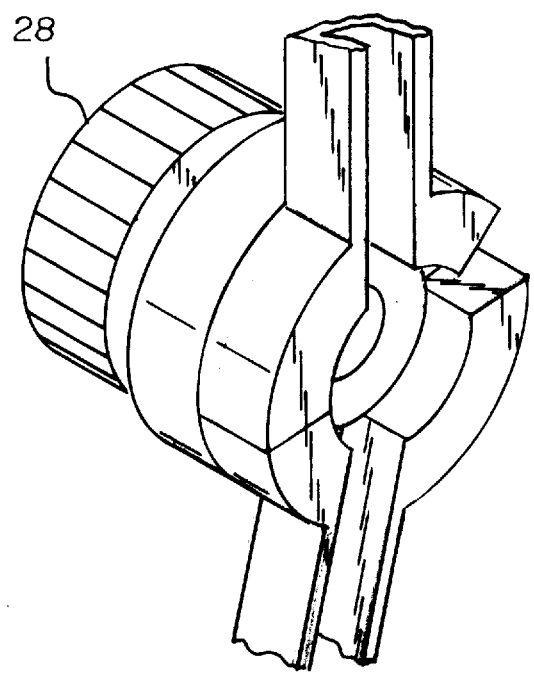
FIG. 4 is a view of one of the pivotal connections between the handle and wheelbase.
Figure 5:
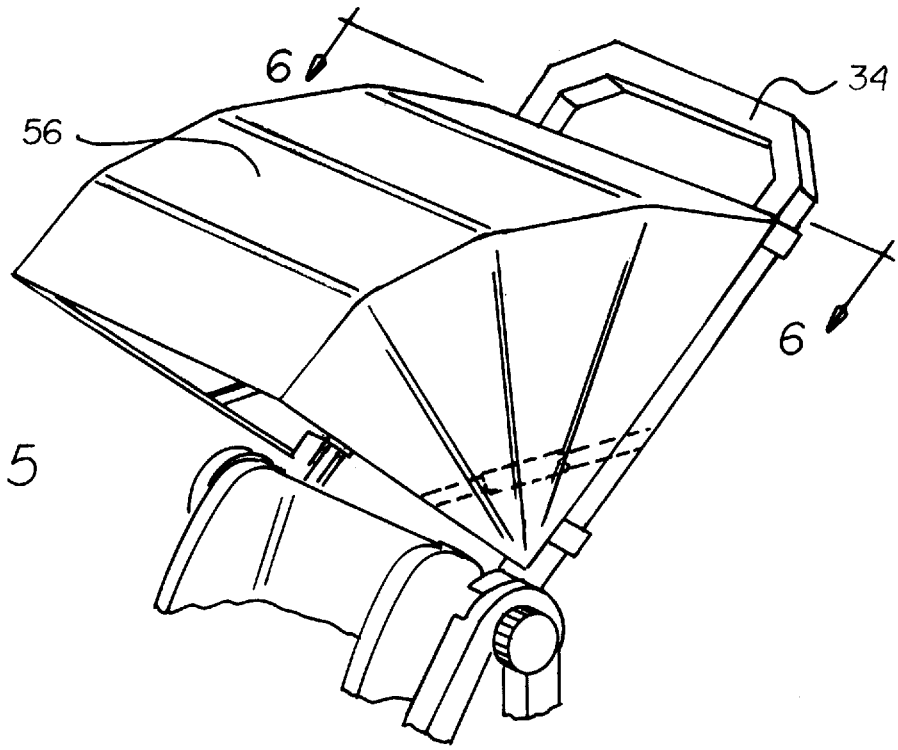
FIG. 5 is a view of the canopy in its extended configuration.
Figure 6:
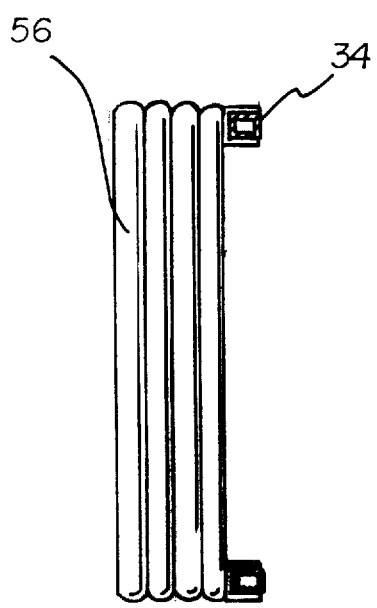
FIG. 6 is a top view of the canopy in a folded configuration.

With reference now to the drawings, and in particular to FIGS. 1 through 6 thereof, the preferred embodiment of the new and improved convertible chair embodying the principles and concepts of the present invention and generally designated by the reference numeral 10 will be described.

The present invention, the new and improved convertible chair is a system 10 comprised of a plurality of components. Such components, in their broadest context, include a both a wheelbase and handle assembly into which a seat is slidably connected. Thus, the seat can be employed in the lower position, in between the wheelbase, to use the device as a stroller. Alternatively, the seat can be positioned in between the handle to thus use the device as a highchair. The details of the components of the present invention, and the manner in which they interrelate, will be described in greater detail hereinafter.

The convertible child's chair 20 of the present invention gains mobility via a wheelbase 22. The wheelbase 22 is defined by a first and a second side 24 and 26 respectively. Each of these sides includes a forward and a rearward wheel at a lower extent, and a threaded engagement member 28 at an upper extent. Furthermore, each of the sides includes a slot 32 formed at an internal location. Each of the slots 32 are defined by a width and a depth.

The convertible chair 20 also employs a handle 34. The handle 34 is defined by a lower extent, an upper extent and an intermediate extent therebetween. The handle 34 is further defined by a first side and a second side(36 and 38 respectively), with each of the sides of the handle 34 having a slot 42 formed at an internal location. Each of the slots 42 of the handle 34 also defined by a width and a depth. The width and depth of the wheelbase slots 32 match the width and the depth of the handle slots 42. Thus, when the slots 42 of the handle are aligned with the slots 32 of the wheelbase two continuous slots are presented.

In order to support the seat 48 in the highchair configuration a pair of spring biased plungers are positioned within the slots of the handle 42. Specifically, a first spring biased plunger 44 is positioned within the slot of the first side of the handle 36, and a second spring biased plunger 46 is positioned within the slot of the second side of the handle 38.

The lower extent of the first side 36 of the handle 34 is threadably engaged with the upper extent of the of first side 24 of the wheel base 22. Likewise, the lower extent of the second side 38 of the handle 34 is threadably engaged with the upper extent of the second side 26 of the wheelbase 22. In this manner, the handle 34 is pivotally connected with the wheelbase 22. A pair of knobs are utilized to tighten the connection between the handle and the wheelbase to prevent their relative rotation once a desired position is achieved.

The seat 48 that is employed within the convertible chair 20 is defined by an upper extent and a lower extent and an intermediate extent therebetween. The seat is further defined by side edges. The seat in supported intermediate the two slots by way of a set of pegs. Specifically, the seat includes a first pair of pegs 52 positioned upon a first side of the seat and a second pair of pegs 54 positioned upon a second side of the seat. The first pair of pegs 52 are positioned within the slot within the first side of the handle 34 and wheelbase 22, while the second pair of pegs 54 are positioned within the slot within the second side of the handle 34 and wheelbase 22. In this manner the seat 48 is capable of sliding from a position inbetween the slots of the wheelbase 22 to a position inbetween the slots of the handle 34. In other words, when the chair 20 in the stroller configuration, the seat 48 is positioned intermediate the slots of the wheelbase 22. Specifically, the pegs of the seat rest within the slots of the wheelbase 22. Alternatively, the seat 48 can be employed in a high chair configuration. To obtain this configuration, the pegs of the chair 48 are slid within the slots along the slots of the wheelbase 22 and into the slots of the handle 34. However, the two spring biased pull locks must be removed from their normal position within the slots of the handle. Once the seat in intermediate the two sides of the handle 34, the pull locks can be repositioned within the slots. In this manner the seat is precluded from sliding back into the slots of the wheelbase 22.

A detachable canopy 56 can positioned at the upper extent of the handle 34 for use in shading an infant in the seat 48. This canopy 56 includes a set of clamps to attach the canopy 56 to the handle 34. Furthermore, a detachable tray 58 is adapted to be removably secured to the side edges of the seat 48. Thus, when in the highchair configuration, the user can secure the tray 48 to the seat 48 to aid in feeding the infant.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved stroller highchair combination comprising, in combination:

a wheelbase having a first and a second side, each of the sides having a forward and a rearward wheel at a lower extent and a pivotal engagement member at an upper apex, each side of the wheelbase extending upwardly and rearwardly relative to the lower extent, each of the sides further including a slot formed at an internal location, each of the slots having a width and a depth each slot extending upwardly and rearwardly relative to the lower extent of each side;

a handle having a lower extent, an upper extent and an intermediate extent therebetween, the handle also having a first side and a second side, the sides being interconnected by way of the upper extent of the handle, each of the sides of the handle having a slot formed at an internal location, each of the slots having a width and a depth, the width and depth of the wheelbase slots matching the width and the depth of the handle slots, a first spring biased plunger positioned within the slot of the first side of the handle, a second spring biased plunger positioned within the slot of the second side of the handle, the lower extent of the first side of the handle being pivotally engaged with the upper apex of the of first side of the wheel base, the lower extent of the second side of the handle being pivotally engaged with the upper apex of the second side of the wheelbase, thus the handle is pivotally connected with the apex of the wheelbase, the handle also extending upwardly from the apex;

a seat having an upper extent and a lower extent and an intermediate extent therebetween, the seat having first and second sides, the seat further including a first pair of pegs positioned upon a first side of the seat, a second pair of pegs positioned upon a second side of the seat, the first pair of pegs positioned within the slot within the first side of the handle and wheelbase the pegs functioning with the spring biased plungers to fix the position of the seat between the sides of the handle, the second pair of pegs positioned within the slot within the second side of the handle and wheelbase, the seat thus being capable of sliding from a position in between the slots of the wheelbase to a position in between the slots of the handle when the slot of the handle and the slots of the wheelbase are co-linear;

a detachable canopy positioned at the upper extent of the handle, the canopy when expanded providing shade to the seat;

a detachable tray adapted to be removably secured to the side edges of the seat.

2. A new and improved stroller highchair combination comprising, in combination:

a wheelbase having a first and a second side, each of the sides having a forward and a rearward wheel at a lower extent and a pivotal engagement member at an upper apex, each side of the wheelbase extending upwardly and rearwardly relative to the lower extent, each of the sides further including a slot formed at an internal location, each of the slots having a width and a depth;

a handle having a lower extent, an upper extent and an intermediate extent therebetween, the handle also having a first side and a second side interconnected by way of the upper extent of the handle, each of the sides of the handle having a slot formed at an internal location, each of the slots having a width and a depth, the width and depth of the wheelbase slots matching the width and the depth of the handle slots, the lower extent of the first side of the handle being pivotally engaged with the upper extent of the of first side of the wheel base, the lower extent of the second side of the handle being pivotally engaged with the upper apex of the second side of the wheelbase, thus the handle is pivotally connected with the apex wheelbase;

a seat having an upper extent and a lower extent and an intermediate extent therebetween, the seat having first and second sides, the seat further including a first pair of pegs positioned upon a first side of the seat, a second pair of pegs positioned upon a second side of the seat, the first pair of pegs positioned within the slot within the first side of the handle and wheelbase, the second pair of pegs positioned within the slot within the second side of the handle and wheelbase, the seat thus being capable of sliding from a position in between the slots of the wheelbase to a position in between the slots of the handle when the slots of the handle are co-linear with the slots of the wheelbase.

3. The stroller highchair combination as described in claim 2 further comprising:

a first spring biased plunger positioned within the slot of the first side of the handle, a second spring biased plunger positioned within the slot of the second side of the handle the plunger cooperating with the pegs of the seat for fixing the position of the seat between the sides of the handle.

4. The stroller highchair combination as described in claim 2 further comprising:

a detachable canopy positioned at the upper extent of the handle, the canopy when expanded providing shade to the seat.

5. The stroller highchair combination as described in claim 2 further comprising:

a detachable tray adapted to be removably secured to the side edges of the seat.

* * * * *